(12) United States Patent
Yarak, III et al.

(10) Patent No.: US 10,082,880 B1
(45) Date of Patent: Sep. 25, 2018

(54) SYSTEM LEVEL FEATURES OF A KEYBOARD

(71) Applicant: Apple Inc., Cupertino, CA (US)

(72) Inventors: William P. Yarak, III, Cupertino, CA (US); Erik T. Stefansson, Cupertino, CA (US); Euan S. Abraham, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/472,260

(22) Filed: Aug. 28, 2014

(51) Int. Cl.
*G06F 1/16* (2006.01)
*G06F 3/02* (2006.01)

(52) U.S. Cl.
CPC .............. *G06F 3/0202* (2013.01); *G06F 1/16* (2013.01)

(58) Field of Classification Search
CPC .................................. G06F 1/16; G06F 3/0202
USPC ........................................ 361/679.08, 679.55
See application file for complete search history.

(56) References Cited

U.S. PATENT DOCUMENTS

| | | | |
|---|---|---|---|
| 3,657,492 A * | 4/1972 | Arndt | B41J 5/08 200/302.2 |
| 3,917,917 A | 11/1975 | Murata | |
| 3,978,297 A | 8/1976 | Lynn et al. | |
| 4,095,066 A | 6/1978 | Harris | |
| 4,319,099 A | 3/1982 | Asher | |
| 4,349,712 A | 9/1982 | Michalski | |
| 4,484,042 A | 11/1984 | Matsui | |
| 4,596,905 A | 6/1986 | Fowler | |
| 4,598,181 A | 7/1986 | Selby | |
| 4,670,084 A | 6/1987 | Durand et al. | |
| 4,755,645 A | 7/1988 | Naoki et al. | |
| 4,937,408 A | 6/1990 | Hattori et al. | |
| 4,987,275 A | 1/1991 | Miller et al. | |
| 5,021,638 A | 6/1991 | Nopper et al. | |
| 5,092,459 A | 3/1992 | Uljanic et al. | |
| 5,136,131 A | 8/1992 | Komaki | |
| 5,278,372 A | 1/1994 | Takagi et al. | |
| 5,280,146 A | 1/1994 | Inagaki et al. | |
| 5,340,955 A | 8/1994 | Calvillo et al. | |

(Continued)

FOREIGN PATENT DOCUMENTS

| | | |
|---|---|---|
| CN | 2155620 | 2/1994 |
| CN | 2394309 | 8/2000 |

(Continued)

OTHER PUBLICATIONS

U.S. Appl. No. 14/281,136, filed May 19, 2014, pending.

(Continued)

*Primary Examiner* — Tuan T Dinh
*Assistant Examiner* — Rockshana D Chowdhury
(74) *Attorney, Agent, or Firm* — Dorsey & Whitney LLP

(57) ABSTRACT

A keyboard device includes a shell having a set of aperture formed into a top surface. A group of keys are disposed in the set of apertures. A platform is disposed under the group of keys and substantially fills an interior of the shell. The platform has a cavity formed in a lower surface of the platform. A circuit board, which is operable to control the keyboard is disposed within the cavity. The platform is configured to prevent ingress of liquid and debris that may enter the set of apertures. In some cases, the shell may have a rear aperture formed into a side wall, which may be configured as an antenna that is tuned to transmit a wireless signals at a transmission frequency.

20 Claims, 9 Drawing Sheets

(56) References Cited

U.S. PATENT DOCUMENTS

| | | | |
|---|---|---|---|
| 5,382,762 A | 1/1995 | Mochizuki | |
| 5,397,867 A | 3/1995 | Demeo | |
| 5,408,060 A | 4/1995 | Muurinen | |
| 5,421,659 A * | 6/1995 | Liang | B41J 5/10 |
| | | | 200/306 |
| 5,422,447 A | 6/1995 | Spence | |
| 5,457,297 A | 10/1995 | Chen | |
| 5,477,430 A | 12/1995 | LaRose et al. | |
| 5,481,074 A | 1/1996 | English | |
| 5,504,283 A | 4/1996 | Kako et al. | |
| 5,512,719 A | 4/1996 | Okada et al. | |
| 5,625,532 A | 4/1997 | Sellers | |
| 5,804,780 A | 9/1998 | Bartha | |
| 5,828,015 A | 10/1998 | Coulon | |
| 5,847,337 A | 12/1998 | Chen | |
| 5,874,700 A | 2/1999 | Hochgesang | |
| 5,875,013 A | 2/1999 | Takahara | |
| 5,876,106 A | 3/1999 | Kordecki et al. | |
| 5,878,872 A | 3/1999 | Tsai | |
| 5,881,866 A | 3/1999 | Miyajima et al. | |
| 5,898,147 A | 4/1999 | Domzaiski et al. | |
| 5,924,555 A | 7/1999 | Sadamori et al. | |
| 5,935,691 A | 8/1999 | Tsai | |
| 5,960,942 A | 10/1999 | Thornton | |
| 5,986,227 A | 11/1999 | Hon | |
| 6,020,565 A | 2/2000 | Pan | |
| 6,068,416 A | 5/2000 | Kumamoto et al. | |
| 6,215,420 B1 * | 4/2001 | Harrison | G06F 3/0202 |
| | | | 200/302.1 |
| 6,257,782 B1 | 7/2001 | Maruyama et al. | |
| 6,259,046 B1 | 7/2001 | Iwama et al. | |
| 6,377,685 B1 | 4/2002 | Krishnan | |
| 6,388,219 B2 | 5/2002 | Hsu et al. | |
| 6,423,918 B1 | 7/2002 | King et al. | |
| 6,482,032 B1 | 11/2002 | Szu et al. | |
| 6,530,283 B2 | 3/2003 | Okada et al. | |
| 6,538,801 B2 | 3/2003 | Jacobson et al. | |
| 6,542,355 B1 | 4/2003 | Huang | |
| 6,552,287 B2 | 4/2003 | Janniere | |
| 6,556,112 B1 | 4/2003 | Van Zeeland et al. | |
| 6,559,399 B2 | 5/2003 | Hsu et al. | |
| 6,560,612 B1 | 5/2003 | Yamada et al. | |
| 6,572,289 B2 | 6/2003 | Lo et al. | |
| 6,573,463 B2 | 6/2003 | Ono | |
| 6,585,435 B2 | 7/2003 | Fang | |
| 6,624,369 B2 | 9/2003 | Ito et al. | |
| 6,706,986 B2 | 3/2004 | Hsu | |
| 6,738,050 B2 | 5/2004 | Comiskey | |
| 6,750,414 B2 | 6/2004 | Sullivan | |
| 6,759,614 B2 | 7/2004 | Yoneyama | |
| 6,762,381 B2 | 7/2004 | Kunthady et al. | |
| 6,765,503 B1 | 7/2004 | Chan et al. | |
| 6,788,450 B2 | 9/2004 | Kawai et al. | |
| 6,797,906 B2 | 9/2004 | Ohashi | |
| 6,850,227 B2 | 2/2005 | Takahashi et al. | |
| 6,860,660 B2 * | 3/2005 | Hochgesang | H01H 13/70 |
| | | | 400/472 |
| 6,911,608 B2 | 6/2005 | Levy | |
| 6,926,418 B2 | 8/2005 | Ostergård et al. | |
| 6,940,030 B2 | 9/2005 | Takeda et al. | |
| 6,977,352 B2 | 12/2005 | Oosawa | |
| 6,979,792 B1 | 12/2005 | Lai | |
| 6,987,466 B1 | 1/2006 | Welch et al. | |
| 6,987,503 B2 | 1/2006 | Inoue | |
| 7,030,330 B2 * | 4/2006 | Suda | G06F 3/0202 |
| | | | 200/302.2 |
| 7,038,832 B2 | 5/2006 | Kanbe | |
| 7,129,930 B1 | 10/2006 | Cathey et al. | |
| 7,134,205 B2 | 11/2006 | Bruennel | |
| 7,146,701 B2 | 12/2006 | Mahoney et al. | |
| 7,151,236 B2 | 12/2006 | Ducruet et al. | |
| 7,151,237 B2 | 12/2006 | Mahoney et al. | |
| 7,154,059 B2 | 12/2006 | Chou | |
| 7,166,813 B2 | 1/2007 | Soma | |
| 7,172,303 B2 | 2/2007 | Shipman et al. | |
| 7,189,932 B2 | 3/2007 | Kim | |
| 7,256,766 B2 | 8/2007 | Albert et al. | |
| 7,283,119 B2 | 10/2007 | Kishi | |
| 7,301,113 B2 | 11/2007 | Nishimura et al. | |
| 7,312,790 B2 | 12/2007 | Sato et al. | |
| 7,378,607 B2 | 5/2008 | Koyano et al. | |
| 7,391,555 B2 | 6/2008 | Albert et al. | |
| 7,414,213 B2 | 8/2008 | Hwang | |
| 7,429,707 B2 | 9/2008 | Yanai et al. | |
| 7,432,460 B2 | 10/2008 | Clegg | |
| 7,510,342 B2 | 3/2009 | Lane et al. | |
| 7,531,764 B1 | 5/2009 | Lev et al. | |
| 7,541,554 B2 | 6/2009 | Hou | |
| 7,589,292 B2 | 9/2009 | Jung et al. | |
| 7,639,571 B2 | 12/2009 | Ishii et al. | |
| 7,651,231 B2 | 1/2010 | Chou et al. | |
| 7,679,010 B2 | 3/2010 | Wingett | |
| 7,724,415 B2 | 5/2010 | Yamaguchi | |
| 7,781,690 B2 | 8/2010 | Ishii | |
| 7,813,774 B2 | 10/2010 | Perez-Noguera | |
| 7,842,895 B2 | 11/2010 | Lee | |
| 7,847,204 B2 | 12/2010 | Tsai | |
| 7,851,819 B2 | 12/2010 | Shi | |
| 7,866,866 B2 | 1/2011 | Wahlstrom | |
| 7,893,376 B2 | 2/2011 | Chen | |
| 7,923,653 B2 | 4/2011 | Ohsumi | |
| 7,947,915 B2 | 5/2011 | Lee et al. | |
| 8,063,325 B2 | 11/2011 | Sung et al. | |
| 8,077,096 B2 * | 12/2011 | Chiang | H01Q 13/10 |
| | | | 343/702 |
| 8,080,744 B2 | 12/2011 | Yeh et al. | |
| 8,098,228 B2 | 1/2012 | Shimodaira et al. | |
| 8,109,650 B2 | 2/2012 | Chang et al. | |
| 8,119,945 B2 | 2/2012 | Lin | |
| 8,124,903 B2 | 2/2012 | Tatehata et al. | |
| 8,134,094 B2 | 3/2012 | Tsao et al. | |
| 8,143,982 B1 | 3/2012 | Lauder et al. | |
| 8,156,172 B2 | 4/2012 | Muehl et al. | |
| 8,184,021 B2 | 5/2012 | Chou | |
| 8,212,160 B2 | 7/2012 | Tsao | |
| 8,212,162 B2 | 7/2012 | Zhou | |
| 8,218,301 B2 | 7/2012 | Lee | |
| 8,232,958 B2 | 7/2012 | Tolbert | |
| 8,246,228 B2 | 8/2012 | Ko et al. | |
| 8,253,048 B2 | 8/2012 | Ozias et al. | |
| 8,253,052 B2 | 8/2012 | Chen | |
| 8,263,887 B2 | 9/2012 | Chen et al. | |
| 8,289,280 B2 | 10/2012 | Travis | |
| 8,299,382 B2 | 10/2012 | Takemae et al. | |
| 8,317,384 B2 | 11/2012 | Chung et al. | |
| 8,319,298 B2 | 11/2012 | Hsu | |
| 8,325,141 B2 | 12/2012 | Marsden | |
| 8,330,725 B2 | 12/2012 | Mahowald et al. | |
| 8,354,629 B2 | 1/2013 | Lin | |
| 8,378,857 B2 | 2/2013 | Pance | |
| 8,383,972 B2 | 2/2013 | Liu | |
| 8,384,566 B2 | 2/2013 | Bocirnea | |
| 8,404,990 B2 | 3/2013 | Lutgring et al. | |
| 8,431,849 B2 | 4/2013 | Chen | |
| 8,436,265 B2 | 5/2013 | Koike et al. | |
| 8,451,146 B2 | 5/2013 | Mahowald et al. | |
| 8,462,514 B2 | 6/2013 | Myers et al. | |
| 8,500,348 B2 | 8/2013 | Dumont et al. | |
| 8,502,094 B2 | 8/2013 | Chen | |
| 8,542,194 B2 | 9/2013 | Akens et al. | |
| 8,548,528 B2 | 10/2013 | Kim et al. | |
| 8,564,544 B2 | 10/2013 | Jobs et al. | |
| 8,569,639 B2 | 10/2013 | Strittmatter | |
| 8,575,632 B2 | 11/2013 | Kuramoto et al. | |
| 8,581,127 B2 | 11/2013 | Jhuang et al. | |
| 8,592,699 B2 | 11/2013 | Kessler et al. | |
| 8,592,702 B2 | 11/2013 | Tsai | |
| 8,592,703 B2 | 11/2013 | Johnson et al. | |
| 8,604,370 B2 | 12/2013 | Chao | |
| 8,629,362 B1 | 1/2014 | Knighton et al. | |
| 8,642,904 B2 | 2/2014 | Chiba et al. | |
| 8,651,720 B2 | 2/2014 | Sherman et al. | |
| 8,731,618 B2 | 5/2014 | Jarvis et al. | |
| 8,748,767 B2 | 6/2014 | Ozias et al. | |

(56) References Cited

U.S. PATENT DOCUMENTS

| | | | |
|---|---|---|---|
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,090 B2 | 9/2014 | Ozaki |
| 8,847,711 B2 | 9/2014 | Yang et al. |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1 | 12/2014 | Hyman |
| 8,922,476 B2 | 12/2014 | Stewart et al. |
| 8,943,427 B2 | 1/2015 | Heo et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,063,627 B2 | 6/2015 | Yairi et al. |
| 9,086,733 B2 | 7/2015 | Pance |
| 9,087,663 B2 | 7/2015 | Los |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,443,672 B2 | 9/2016 | Martisauskas |
| 9,448,628 B2 | 9/2016 | Tan et al. |
| 9,471,185 B2 | 10/2016 | Guard |
| 9,477,382 B2 | 10/2016 | Hicks et al. |
| 9,612,674 B2 | 4/2017 | Degner et al. |
| 9,734,965 B2 | 8/2017 | Martinez et al. |
| 9,761,389 B2 | 9/2017 | Leong et al. |
| 9,793,066 B1 | 10/2017 | Brock et al. |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0149835 A1 | 10/2002 | Kanbe |
| 2003/0169232 A1 | 9/2003 | Ito |
| 2004/0004559 A1 | 1/2004 | Rast |
| 2004/0225965 A1 | 11/2004 | Garside et al. |
| 2004/0257247 A1 | 12/2004 | Lin et al. |
| 2005/0035950 A1* | 2/2005 | Daniels | G06F 1/1616 |
| | | | 345/169 |
| 2005/0224326 A1* | 10/2005 | Oikawa | H01H 13/063 |
| | | | 200/302.1 |
| 2005/0253801 A1 | 11/2005 | Kobayashi |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0025072 A1* | 2/2007 | Liao | G06F 1/1616 |
| | | | 361/679.21 |
| 2007/0200823 A1 | 8/2007 | Bytheway et al. |
| 2007/0285393 A1 | 12/2007 | Ishakov |
| 2008/0074329 A1* | 3/2008 | Caballero | H01Q 1/088 |
| | | | 343/702 |
| 2008/0131184 A1 | 6/2008 | Brown et al. |
| 2008/0136782 A1 | 6/2008 | Mundt et al. |
| 2008/0251370 A1 | 10/2008 | Aoki |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0251384 A1* | 10/2009 | Ligtenberg | H01H 13/705 |
| | | | 343/904 |
| 2009/0262085 A1 | 10/2009 | Wassingbo et al. |
| 2009/0267892 A1 | 10/2009 | Faubert |
| 2010/0045705 A1 | 2/2010 | Vertegaal et al. |
| 2010/0066568 A1 | 3/2010 | Lee |
| 2010/0109921 A1 | 5/2010 | Annerfors |
| 2010/0156796 A1 | 6/2010 | Kim et al. |
| 2010/0213044 A1 | 8/2010 | Strittmatter et al. |
| 2010/0253630 A1 | 10/2010 | Homma et al. |
| 2011/0032127 A1 | 2/2011 | Roush |
| 2011/0056817 A1 | 3/2011 | Wu |
| 2011/0056836 A1* | 3/2011 | Tatebe | C25D 11/16 |
| | | | 205/50 |
| 2011/0203912 A1 | 8/2011 | Niu et al. |
| 2011/0205179 A1 | 8/2011 | Braun |
| 2011/0261031 A1 | 10/2011 | Muto |
| 2011/0267272 A1 | 11/2011 | Meyer et al. |
| 2011/0284355 A1 | 11/2011 | Yang |
| 2011/0303521 A1 | 12/2011 | Niu et al. |
| 2012/0012446 A1 | 1/2012 | Hwa |
| 2012/0032972 A1 | 2/2012 | Hwang |
| 2012/0090973 A1 | 4/2012 | Liu |
| 2012/0098751 A1 | 4/2012 | Liu |
| 2012/0168294 A1 | 7/2012 | Pegg |
| 2012/0193202 A1 | 8/2012 | Chen |
| 2012/0286701 A1 | 11/2012 | Yang et al. |
| 2012/0298496 A1 | 11/2012 | Zhang |
| 2012/0313856 A1* | 12/2012 | Hsieh | H04W 76/14 |
| | | | 345/168 |
| 2013/0043115 A1 | 2/2013 | Yang et al. |
| 2013/0093500 A1 | 4/2013 | Bruwer |
| 2013/0093733 A1 | 4/2013 | Yoshida |
| 2013/0099983 A1* | 4/2013 | Han | H01Q 1/243 |
| | | | 343/702 |
| 2013/0100030 A1 | 4/2013 | Los et al. |
| 2013/0120265 A1 | 5/2013 | Horii et al. |
| 2013/0155593 A1* | 6/2013 | Liang | G06F 3/0202 |
| | | | 361/679.08 |
| 2013/0161170 A1 | 6/2013 | Fan et al. |
| 2013/0162450 A1 | 6/2013 | Leong et al. |
| 2013/0215079 A1 | 8/2013 | Johnson et al. |
| 2013/0242601 A1 | 9/2013 | Kloeppel et al. |
| 2013/0270090 A1* | 10/2013 | Lee | H01H 13/84 |
| | | | 200/5 A |
| 2014/0027259 A1 | 1/2014 | Kawana et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0116865 A1 | 5/2014 | Leong et al. |
| 2014/0118264 A1 | 5/2014 | Leong et al. |
| 2014/0151211 A1 | 6/2014 | Zhang |
| 2014/0184496 A1 | 7/2014 | Gribetz et al. |
| 2014/0191973 A1 | 7/2014 | Zellers et al. |
| 2014/0218851 A1 | 8/2014 | Klein et al. |
| 2014/0251772 A1 | 9/2014 | Welch et al. |
| 2014/0252881 A1 | 9/2014 | Dinh et al. |
| 2014/0291133 A1 | 10/2014 | Fu et al. |
| 2014/0320436 A1 | 10/2014 | Modarres et al. |
| 2014/0346025 A1 | 11/2014 | Hendren et al. |
| 2014/0375141 A1 | 12/2014 | Nakajima |
| 2015/0016038 A1 | 1/2015 | Niu et al. |
| 2015/0083561 A1 | 3/2015 | Han et al. |
| 2015/0090570 A1 | 4/2015 | Kwan et al. |
| 2015/0090571 A1 | 4/2015 | Leong et al. |
| 2015/0227207 A1 | 8/2015 | Winter et al. |
| 2015/0243457 A1 | 8/2015 | Niu et al. |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |
| 2015/0309538 A1 | 10/2015 | Zhang |
| 2015/0332874 A1 | 11/2015 | Brock et al. |
| 2015/0348726 A1 | 12/2015 | Hendren |
| 2015/0378391 A1 | 12/2015 | Huitema et al. |
| 2016/0049266 A1 | 2/2016 | Stringer et al. |
| 2016/0093452 A1 | 3/2016 | Zercoe et al. |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0259375 A1 | 9/2016 | Andre et al. |
| 2016/0329166 A1 | 11/2016 | Hou et al. |
| 2016/0336124 A1 | 11/2016 | Leong et al. |
| 2016/0336127 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |

(56) References Cited

U.S. PATENT DOCUMENTS

| | | |
|---|---|---|
| 2016/0378234 A1 | 12/2016 | Ligtenberg et al. |
| 2016/0379775 A1 | 12/2016 | Leong et al. |
| 2017/0004939 A1 | 1/2017 | Kwan et al. |
| 2017/0011869 A1 | 1/2017 | Knopf et al. |
| 2017/0090106 A1 | 3/2017 | Cao et al. |
| 2017/0301487 A1 | 10/2017 | Leong et al. |
| 2017/0315624 A1 | 11/2017 | Leong et al. |
| 2018/0029339 A1 | 2/2018 | Liu et al. |
| 2018/0040441 A1 | 2/2018 | Wu et al. |
| 2018/0074694 A1 | 3/2018 | Lehmann et al. |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200961844 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101438228 | 5/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 101868773 | 10/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102679239 | 9/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| DE | 202008001970 | 8/2008 |
| EP | 0441993 | 8/1991 |
| EP | 1835272 | 9/2007 |
| EP | 1928008 | 6/2008 |
| EP | 2022606 | 6/2010 |
| EP | 2426688 | 3/2012 |
| EP | 2439760 | 4/2012 |
| EP | 2463798 | 6/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S61172422 | 10/1986 |
| JP | S62072429 | 4/1987 |
| JP | S63182024 | 11/1988 |
| JP | H0422024 | 4/1992 |
| JP | H0520963 | 1/1993 |
| JP | H0524512 | 8/1993 |
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2003114751 | 9/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2008293922 | 12/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011018484 | 1/2011 |
| JP | 2011065126 | 3/2011 |
| JP | 2011150804 | 8/2011 |
| JP | 2011165630 | 8/2011 |

(56) References Cited

FOREIGN PATENT DOCUMENTS

| | | |
|---|---|---|
| JP | 2011524066 | 8/2011 |
| JP | 2011187297 | 9/2011 |
| JP | 2012022473 | 2/2012 |
| JP | 2012043705 | 3/2012 |
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014026807 | 2/2014 |
| JP | 2014216190 | 11/2014 |
| JP | 2014220039 | 11/2014 |
| JP | 2016053778 | 4/2016 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

OTHER PUBLICATIONS

U.S. Appl. No. 14/326,858, filed Jul. 9, 2014, pending.
U.S. Appl. No. 14/499,209, filed Sep. 28, 2014, pending.
U.S. Appl. No. 14/501,121, filed Sep. 30, 2014, pending.
U.S. Appl. No. 14/501,680, filed Sep. 30, 2014, pending.
U.S. Appl. No. 14/502,788, filed Sep. 30, 2014, pending.
U.S. Appl. No. 14/736,151, filed Jun. 10, 2015, pending.
U.S. Appl. No. 14/765,145, filed Jul. 31, 2015, pending.
U.S. Appl. No. 14/826,590, filed Aug. 14, 2015, pending.
U.S. Appl. No. 14/867,598, filed Sep. 28, 2015, pending.
U.S. Appl. No. 14/867,672, filed Sep. 28, 2015, pending.
U.S. Appl. No. 14/867,712, filed Sep. 28, 2015, pending.
U.S. Appl. No. 14/867,746, filed Sep. 28, 2015, pending.
Elekson, "Reliable and Tested Wearable Electronics Embedment Solutions," http://www.wearable.technology/our-technologies, 3 pages, at least as early as Jan. 6, 2016.

* cited by examiner

SECTION A-A

SYSTEM LEVEL FEATURES OF A KEYBOARD

TECHNICAL FIELD

This disclosure relates generally to input devices, and more specifically to a keyboard device having a deep-draw shell and various other features.

BACKGROUND

Traditional input devices, such as keyboards, may be formed from a large number of components and subassemblies that may be integrated into a relatively large or bulky form factor. The size and complexity of a traditional keyboard may be due, in part, to the design and construction of the enclosure and the size and form factor of the circuit board or other electronic components. Additionally, many input devices have components such as circuit boards and electronics that may be vulnerable to contaminants such as water or other liquids. For example, a keyboard having keys and key openings located on the top of the device may be particularly susceptible to water ingress, which may corrode, destroy or otherwise damage electronic components or circuit boards that are located beneath the key openings. Therefore, there is a need for an input device having a simplified design that may also provide adequate protection for internal components.

SUMMARY

The present disclosure includes systems, methods, and apparatuses involving an input device and various feature. An input device (such as a keyboard) may include a deep-draw shell having an aperture formed into a top surface in which a selector (e.g., a key of a keyboard) is positioned or disposed. A platform is positioned or disposed under the selector and substantially fills the interior of the deep-draw shell. The platform may be substantially wedge-shaped. The platform includes a cavity formed into a lower surface and a circuit board is disposed within the cavity. The platform may be configured to block or shield the circuit board from liquid or other debris that may enter the aperture formed in the top of the deep-draw shell. The platform and/or the positioning of the circuit board within the cavity may keep the circuit board away from liquid that may pool near the bottom of the input device. In some deep-draw shells, the circuit board is offset with respect to a lower edge of the deep-draw shell. The platform may also stiffen and/or otherwise strengthen the input device. For example, the platform may provide structural support of the deep-draw shell.

In some implementations, the circuit board may include an antenna and/or antenna controller for transmitting wireless signals and/or data. In some examples, the deep-draw shell may have an aperture formed in a rear or side wall. The aperture may be configured to facilitate the transmission of wireless signals or data and may be tuned for a particular transmission frequency.

In various embodiments, an input device may include a selector; a deep-draw shell with an aperture on a top surface in which the selector is positioned; a platform positioned under the selector having a cavity in an underside; and a circuit board positioned on an upper surface of the cavity that is electrically connected to the selector. In some embodiments, the antenna aperture includes a first surface and a second surface that are electrically coupled to a wireless transmission circuit of the circuit board In embodiments, the input device also includes a switch circuit board disposed between the selector (or group of keys) and the platform. The switch circuit board may include a set of switches that are configured to actuate on depression of the group of keys In some embodiments, the circuit board includes a substrate forming a tab portion and a series of conductor terminals that are disposed on or formed onto the tab portion. The tab portion may form a male connector for a mating cable that is configured to provide power to the circuit board. The make connector may form the mechanical and electrical connection to the mating cable.

In one or more embodiments, a method making a keyboard may include: forming a deep-draw shell by drawing a sheet of aluminum to form an enclosure having a top surface and multiple side surfaces; cutting a set of apertures in the top surface of the deep-draw shell; installing a group of keys in the deep-draw shell, wherein the group of keys are disposed within the set of apertures; installing a platform in the deep-draw shell under the group of keys, the platform having cavity formed in a lower surface; installing a circuit board within the cavity; and electrically coupling the circuit board to the group of keys. In some embodiments, one or more of the side surfaces.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
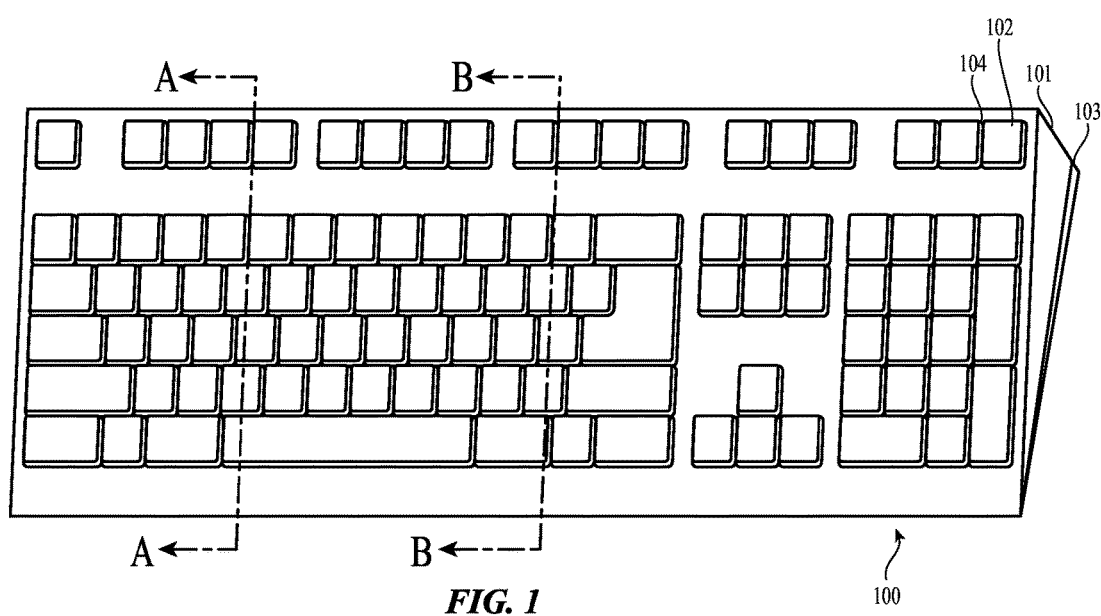
FIG. 1 is a isometric view of an example wireless keyboard.

The description that follows includes sample systems, apparatuses, and methods that embody various elements of the present disclosure. However, it should be understood that the described disclosure may be practiced in a variety of forms in addition to those described herein.

The present disclosure describes systems, methods, and apparatuses involving input device features. An input device may include a deep-draw shell having a set of apertures formed into a top surface in which selectors or a group of keys are positioned, a platform may be positioned under the selector or keys. The platform may have a cavity in formed into an underside of the platform. A circuit board may be disposed within the cavity and positioned on the upper surface of the cavity. The platform may stiffen the input device and/or block the circuit board from liquid or other debris that may enter the apertures. In some implementations, the input device may be a keyboard such as a wireless keyboard and the selector may include a set of alphanumeric keyboard keys.

In various implementations, the circuit board may have a substrate including a tab portion with one or more conductors such as one or more traces disposed thereon. The tab portion may form a male connector such as a male power connector for the circuit board and/or the input device that connects to a power cable. For example, the input device may be a wireless keyboard and the male connector may be a power connector that connects to a power cable for charging a rechargeable battery included in the wireless keyboard.

In some implementations, the deep-draw shell may have an antenna formed into a side or back wall of the shell. The aperture may be configured to facilitate wireless signal transmission. In some cases, the aperture includes a first and second surfaces and the circuit board may include an antenna and/or antenna controller electrically coupled to the first and second surfaces. The antenna may utilize the aperture for wireless (such as Bluetooth) broadcasting and/or receiving. In some case, the dimensions of the antenna aperture may be tuned to the antenna. For example, the width of the aperture may be configured to facilitate transmission and reception at a particular transmission frequency.

In various implementations, a wireless keyboard may be assembled by forming a deep-draw shell by bending a sheet of aluminum and/or other material and cutting and/or stamping out apertures for keys. Keys may be inserted in the deep-draw shell positioned in the apertures and a platform having an underside cavity may be inserted in the deep-draw shell under the keys. A circuit board may be coupled on a top inside surface of the underside cavity.

In some embodiments, the deep-draw shell is formed from a single metal sheet to form the top surface and multiple sides of the input device or keyboard. In some implementations, the deep-draw shell is formed by deep drawing or stamping a metal sheet to form the enclosure of the device without welds or seams formed along adjacent walls. Using a single sheet to form both the top and side walls of the shell may be challenging due to the stress that may be placed on the shell material during a deep drawing process. However, forming the deep-draw shell from a single sheet without seams or welds along adjacent walls may improve the structural rigidity of the shell and may also simplify part finishing and other manufacturing processes.

FIG. 1 is a isometric view of an example wireless keyboard 100. As illustrated, the wireless keyboard may include a deep-draw shell 101, which may be formed from a sheet of aluminum and anodized an polished. The keyboard 100 also includes a base 103 or bottom plate, and a group of keys 102 positioned or disposed in a set of apertures 104 formed in an upper surface of the deep-draw shell 101.

Although this example is a wireless keyboard 100 with keys 102, it is understood that this is an example. In various implementations any kind of input device (such as a mouse, track pad, touch screen, touch pad, wired keyboard, computer with integrated keyboard, alpha and/or numeric keypad, stylus, and/or any other input device) with any kind and/or number of selectors (such as one or more buttons, touch sensors, knobs, and/or other selectors) may be utilized without departing from the scope of the present disclosure.

Figure 2:
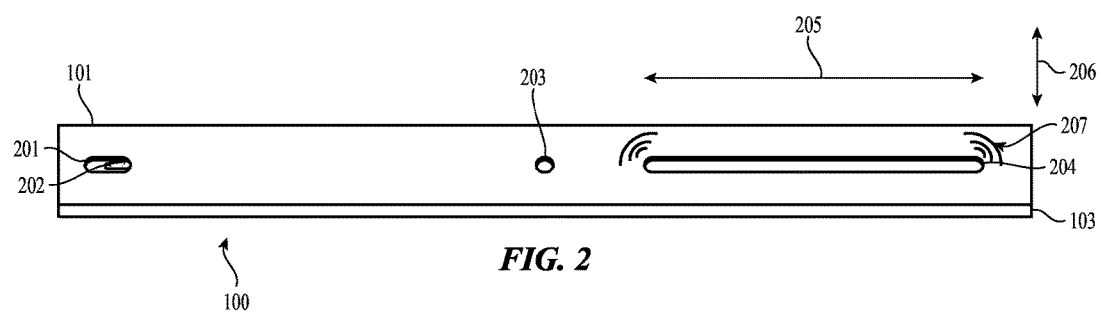
FIG. 2 is a rear view of the example wireless keyboard of FIG. 1.

FIG. 2 is a rear view of the example wireless keyboard 100 of FIG. 1. As illustrated, in various implementations the deep-draw shell 101 may include a switch aperture 201 for a power and/or other switch 202, a power and/or other connector aperture 203, and/or an antenna aperture 204.

The power switch 202 may be formed of a material of a first color (such as white) and include a portion that is colored a second color (such as green or red). For example, the power switch may be formed using a two-shot injection molding process where the first color material is formed using a first shot of white plastic and the second color portion is formed by injecting a second shot of green or red plastic in a cavity left by the first shot. When the power switch is in a first position (such as an "off" position), the second colored portion may not be visible through the switch aperture 201. However, when the power switch is in a second position (such as an "on" position), the second colored portion may be visible through the switch aperture. As such, the status of the power switch may be readily ascertainable by visual inspection.

In the example depicted in FIG. 2, the wireless keyboard 100 may include wireless communication circuitry that is configured to transmit and receive wireless signals or data at a transmission frequency. In the present example, the aperture 204 facilitates the transmission of the wireless signals or data. In some cases, where the deep-draw shell 101 is formed from a conductive material, the aperture 204 may form a window or opening allowing wireless signals to pass in and out of the deep-draw shell 101. In some cases, the length 205, height 206, and/or other dimensions of the aperture 204 may be configured or tuned for the transmission frequency.

Figure 3:
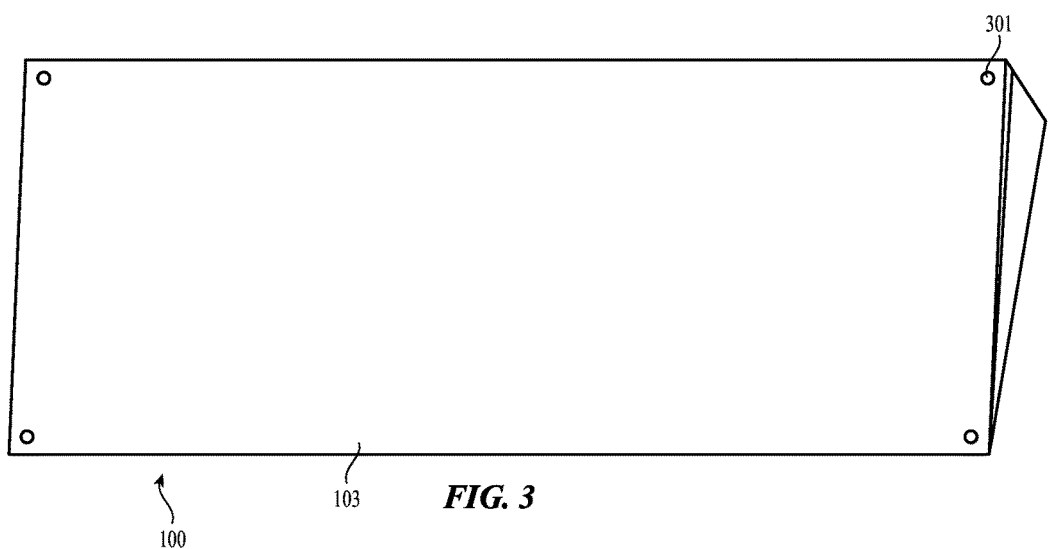
FIG. 3 is a bottom view of the example wireless keyboard of FIG. 1.

FIG. 3 is a bottom view of the example wireless keyboard 100 of FIG. 1. In some implementations, the keyboard 100 includes a base 103, which is formed from a conductive material, such as aluminum or other metal alloy. As illustrated, the base 103 may include a number of feet 301. The feet may operate to stabilize the wireless keyboard on a surface, prevent the wireless keyboard from sliding during operation, and/or perform other functions. In some implementations, the feet 301 may be formed of various kinds of rubber, elastomer, plastic, and/or other materials.

Figure 4:
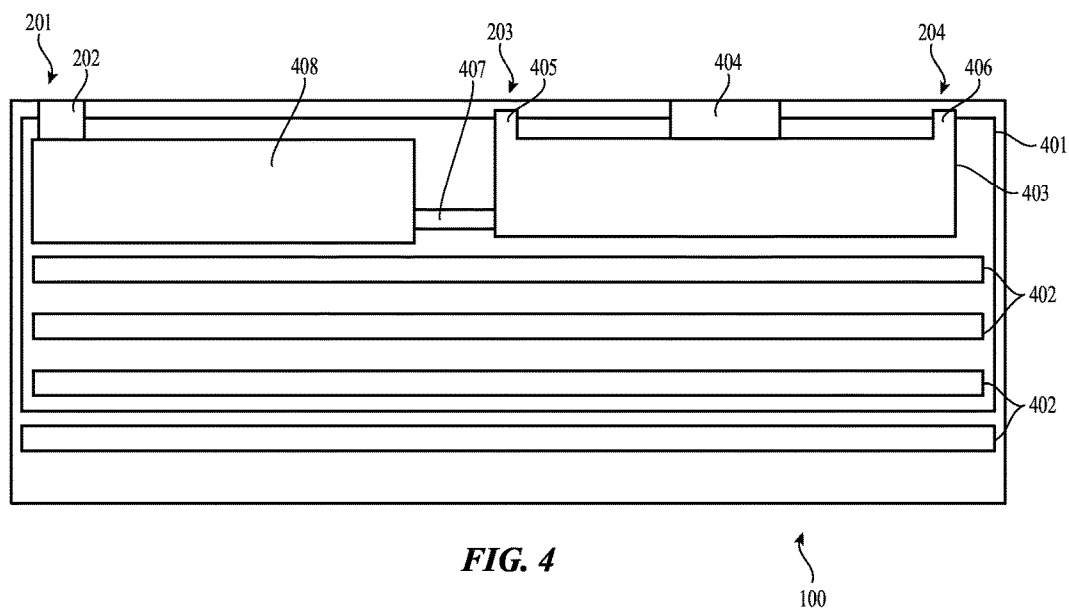
FIG. 4 illustrates the view of FIG. 3 with the base of the example wireless keyboard removed.

FIG. 4 illustrates the bottom view of FIG. 3 with the base 103 of the example wireless keyboard 100 removed. As illustrated, a platform 401 may be positioned in the deep-draw shell 101. In some cases, the platform 401 substantially fills the interior enclosure formed by the deep-draw shell 101. This platform may be substantially wedge-shaped in some implementations.

The platform 401 may provide structural support of the deep-draw shell 101. For example, as the platform may substantially fill the interior enclosure formed by the deep-draw shell, the platform may cause portions of the deep-draw shell (and/or the base 103) to resist moving inward when force is applied to external areas of the deep-draw shell. By way of another example, the platform may be connected to various portions of the deep-draw shell, such as by adhesive, welding, and/or other techniques. Due to such connection, the structural rigidity of the deep-draw shell may be that of the deep-draw shell and the platform combined as opposed to just the deep-draw shell.

A circuit board or main circuit board 403 and/or one or more rechargeable batteries (and/or other batteries) 408 may be coupled to the platform 401. The circuit board may include a substrate having a power connector 405 and/or other connector, an antenna terminal 406, and/or other components. The power connector 405 may be accessible via the aperture 203 and the antenna terminal 406 may be positioned adjacent to the antenna aperture 204. The circuit board may be electrically coupled to the rechargeable battery via a connector 407 and/or communicably coupled to a key layer 501 (see FIG. 5) around the platform via a ribbon connector cable 404. Adhesive strips 402 may be disposed on a lower surface of the platform 401, the rechargeable battery, the circuit board 403, and/or other components. The adhesive strips 402 may be formed from double-sided tape that couples the components and/or the deep-draw shell 101 to the base 103.

Figure 5:
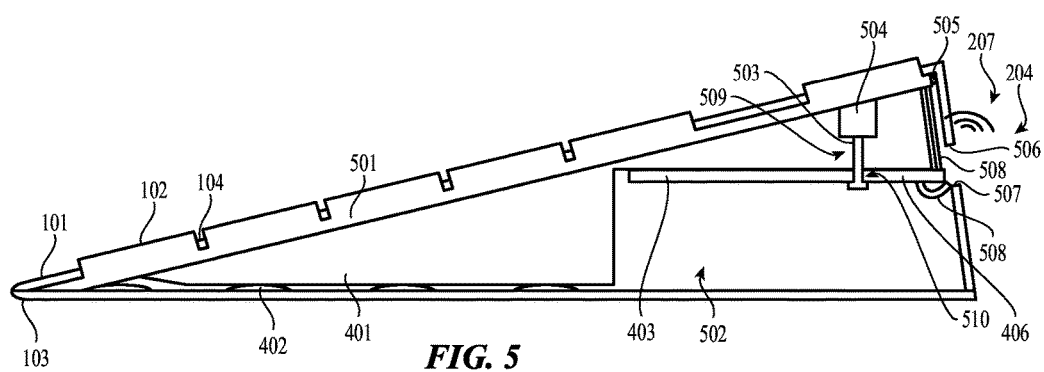
FIG. 5 is a cross sectional schematic view of the example wireless keyboard of FIG. 1 taken along the line A-A of FIG. 1.

FIG. 5 is a cross sectional schematic view of the example wireless keyboard 100 of FIG. 1 taken along section A-A of FIG. 1. As illustrated, a key layer 501 may be positioned in the deep-draw shell 101 such that keys 102 are positioned in the apertures 104. The key layer 501 may include a switch circuit board disposed below the keys 102 and disposed above the platform 401. The switch circuit board may include a set of switches that are configured to actuate on depression of the of keys 102. Activation of one or more of the keys 102 (such as by depression of a key activating one or more switches) by a user may be transmitted from the key layer 501 to the circuit board 403 via the ribbon connector cable 508, which may be routed around an edge of the platform 401. The circuit board 403 may include one or more components (not shown) for receiving and processing indications of key activation and/or performing other tasks such as one or more processing units, one or more input/output components, one or more communication components, and/or one or more non-transitory storage media (which may take the form of, but is not limited to, a magnetic storage medium; optical storage medium; magneto-optical storage medium; read only memory; random access memory; erasable programmable memory; flash memory; and so on). In some implementations, the components may all be positioned on a single surface of the circuit board, such as (with reference to the view shown in FIG. 5) an underside of the circuit board.

As also illustrated in FIG. 5, the platform 401 (which may be formed of a material such as plastic, thermoplastic, Polycarbonate/Acrylonitrile Butadiene Styrene, and/or other material(s)) may be substantially wedge-shaped and may provide stiffness and/or other strength to the wireless keyboard 100. The platform may also have an underside cavity 502 formed in a lower surface of the platform 401. The circuit board 403 may be coupled to an upper or top inside surface of the cavity. As the platform 401 is positioned between the circuit board 403 and the apertures 104, the platform 401 may block or shield water, liquid, or other debris that enters the apertures 104 from coming into contact with the circuit board 403. Instead, any liquid that does enter through the apertures 104 may flow along an outer surface of the platform 401 toward the base 103.

Further, as the circuit board 403 may offset from a lower edge of the deep-draw shell 101, any liquid that enters the wireless keyboard 100 may not reach the circuit board 403 even if the liquid pools on an interior surface of the base 103. In some cases, liquid entering the aperture 203 and/or the antenna aperture 204 may not contact the circuit board 403 and instead flow toward the base 103. Thus, the platform 401 and/or configuration of the wireless keyboard 100 may provide waterproofing and/or other liquid protection for the circuit board and/or other components.

As further illustrated in FIG. 5, the circuit board 403 may include an antenna terminal 406 and/or antenna portion. The antenna may be an actual antenna, components of an antenna, and/or antenna controller components. The antenna terminal 406 may be electrically coupled to the deep-draw shell 101, which may be formed from an electrically conductive material, such as aluminum. In some cases, the aperture 204 formed in a rear wall of the deep-draw shell 101 may facilitate the transmission and reception of wireless signals 207.

For example, as illustrated, a screw may electrically connect the circuit board 406 to a connector 504 that is coupled to the key layer 501. In some implementations, the deep-draw shell 101 may be formed of aluminum having an anodized coating and hence the surface of the deep-draw shell may not be conductive. However, the key layer 501 may be spot welded 505 and/or otherwise coupled to the deep-draw shell in such a way that a conductive path is formed between the key layer 501 and the deep-draw shell 101 such that a conductive path is formed between the circuit board 403 and the deep-draw shell 101.

In some cases the antenna terminal 406 may electrically excite the deep-draw shell 101. In some cases, the antenna aperture 204 is configured to facilitate wireless transmissions and reception at a transmission frequency. As previously discussed, the shape and dimensions of the aperture 204 (such as the length 205 and/or height 206 shown in FIG. 2 and/or other dimensions) may be configured to produce emanations. In this way, the antenna aperture 204 may be tuned to the frequency and/or other wireless characteristics of the antenna and/or the wireless transmissions.

Figure 6:
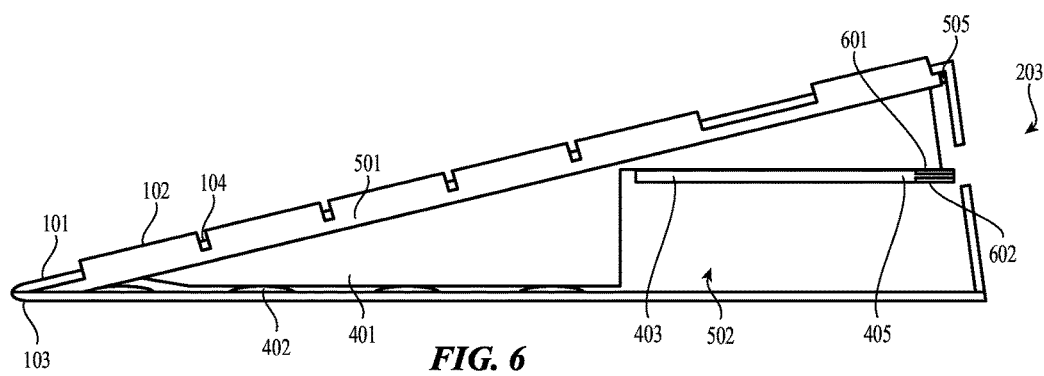
FIG. 6 is a cross sectional schematic view of the example wireless keyboard of FIG. 1 taken along the line B-B of FIG. 1.

FIG. 6 is a cross sectional schematic view of the example wireless keyboard 100 of FIG. 1 taken along section B-B of FIG. 1. As illustrated, the circuit board 403 may include a connector 405 portion having one or more conductors 601 and/or 602. The connector may be a portion of the substrate of the circuit board, such as a tab, that is configured as a power connector. In some cases, the tab of the connector 405 may facilitate both electrical and mechanical connection with an external device, such as a cable.

Figure 7:
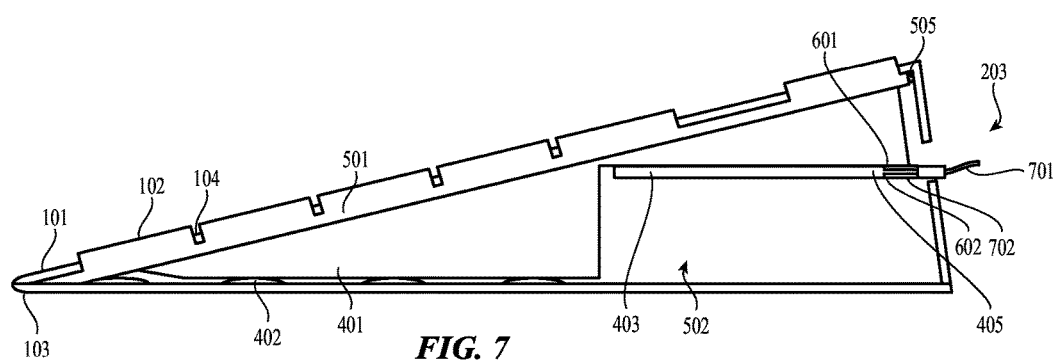
FIG. 7 is illustrates the view of FIG. 6 with a power cable is connected to the connector.

The connector 405 may be a "male" connector as the connector may couple to a corresponding "female" connector by being inserted into the corresponding female connector such that the conductors of the connector contact one or more conductors of the female connector. For example, FIG. 7 is illustrates the view of FIG. 6 after a female power connector 702 of a power cable 701 is connected to the connector. As illustrated, the female power connector may cover the conductors 601 and 602. In this configuration, the wireless keyboard 100 may charge the rechargeable battery 408 utilizing power from the power cord.

Figure 8:
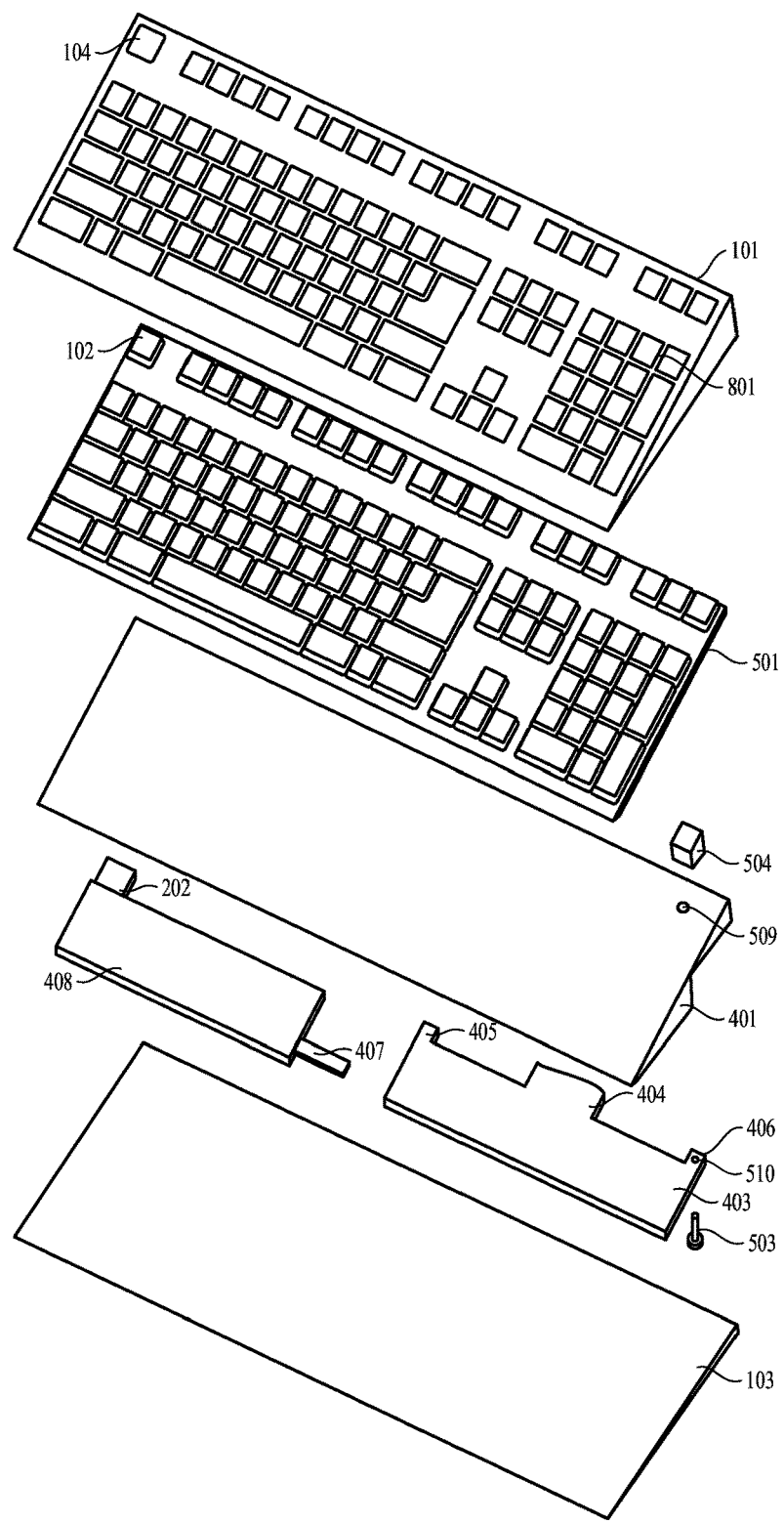
FIG. 8 is an exploded view of the example wireless keyboard of FIG. 1.

FIG. 8 is an exploded view of the example wireless keyboard 100 of FIG. 1. As illustrated, the key layer 501 may be coupled to the deep-draw shell 101 such that the keys 102 are positioned in and/or at least partly protrude through the apertures 104. The platform 401 may be coupled to the key layer (such as utilizing tape) with the conductive connector 504 positioned in an aperture 509 of the platform. The rechargeable battery 408 and the circuit board 403 may be coupled to an underside of the platform. The screw 503 may be inserted into an aperture 510 of the circuit board and/or the aperture 509 to couple with the conductive connector. The base 103 may be coupled to the platform 401 and/or the deep-draw shell 101.

As also illustrated in FIG. 8, the surface of the deep-draw shell 101 that includes the apertures 104 may also include web 801. The web may be the portion of the deep-draw shell surface that separates apertures that are proximate. In some cases, the ratio between the area of apertures and the area of web (measured as the total area of the dimensions of the apertures compared to the total area of the dimensions of deep-draw shell portions, or web, separating proximate apertures) of the deep-draw shell may be large. For example, the ratio between the area of the apertures and the area of the web may be 95%.

Although the present disclosure is illustrated and described above in the context of a wireless keyboard 100 with keys 102, it is understood that this is an example. In various implementations, features such as the platform 401, the connector 405, and/or the tuned antenna aperture 204 may be utilized in other kinds of input devices that include any kind of selector (such as buttons, track pads, touch sensors, and so on) such as mice, numeric key pads, styluses, microphones, and/or any other kind of input device without departing from the scope of the present disclosure.

Further, although the wireless keyboard 100 is illustrated and described above as including the platform 401, the connector 405, and the tuned antenna aperture 204, it is understood that this is an example. In various implementations, one or more of these features may be utilized separately in an input device and/or such features may be utilized in various combinations without departing from the scope of the present disclosure. Discussion of the platform, connector, and tuned antenna aperture as included in a single input device is not intended to be limiting.

Moreover, although the present disclosure is illustrated and described above in the context of input devices, it is understood that this is an example. In various implementations, input devices may also provide visual, audio, tactile, and/or other output to a user without departing from the scope of the present disclosure.

Figure 9:
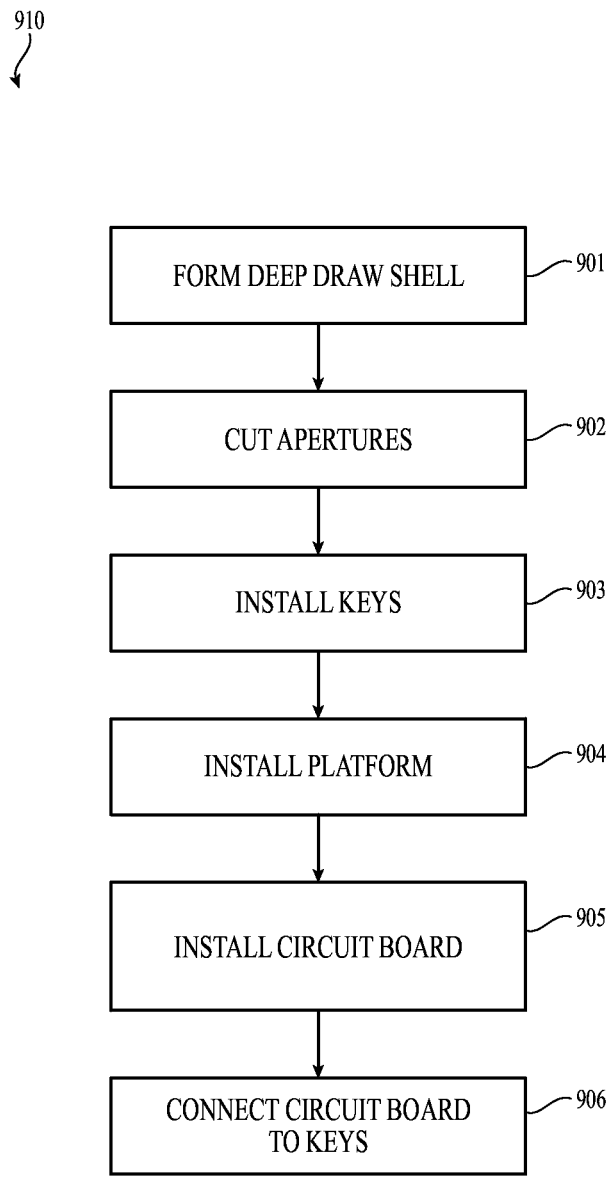
FIG. 9 is a method diagram illustrating an example method for assembling a keyboard. This method may assemble the example wireless keyboard illustrated in FIGS. 1-8.

FIG. 9 is a method diagram illustrating an example method 900 for assembling a keyboard. This method may assemble the example wireless keyboard illustrated in FIGS. 1-8.

The flow begins at block 901 where a deep-draw shell is formed. For example, a deep-draw shell may be formed by bending and/or drawing an aluminum sheet. However, though the sheet is described as aluminum in this example, it is understood that this is an example and in various implementations the sheet may be formed of a material other than aluminum. In some implementations, the aluminum sheet may be anodized aluminum. In various implementations, the aluminum sheet may be bent to form a wedge-shaped deep-draw shell with a top portion, back wall, and side walls. The flow may then proceed to block 902 where apertures may be cut in the deep-draw shell. The apertures may be key apertures. Such key apertures may be cut out, stamped out, and/or otherwise formed in the deep-draw shell. The flow may then proceed to block 903.

At block 903, keys may be installed in the deep-draw shell. For example, a key layer may be inserted in the deep-draw shell. When inserted in the deep-draw shell, keys of the key layer may be positioned in and/or at least partially extend through the key apertures.

The flow may then proceed to block 904 where a platform, such as a wedge-shaped platform, may be installed. The platform may be installed by being inserted in the deep-draw shell under the keys. The platform may be coupled to the keys and/or the deep-draw shell, such as utilizing tape and/or adhesive. The flow may then proceed to block 905 where a circuit board (and/or battery) is installed. For example, the circuit board may be inserted in a cavity on the underside of the platform. The circuit board may be coupled to a top inner surface of the cavity. Next, the flow may proceed to block 906 where the circuit board is connected to the keys. The connection may be formed utilizing a connector that is positioned around the platform.

Although the method 900 has been illustrated and described above as including particular operations performed in a particular order, it is understood that this is an example. In other implementations, various orders of the same, similar, and/or different operations may be performed without departing from the scope of the present disclosure.

For example, the method 900 may include the additional operation of welding part of the keys (and/or a key layer) to the deep-draw shell without departing from the scope of the present disclosure. In still other implementations, the keys may be electrically connected to the deep-draw shell by a process other than welding.

By way of another example, the method 900 may include the additional operation of anodizing the deep-draw shell (such as in implementations where the deep-draw shell is formed by bending an aluminum sheet) without departing from the scope of the present disclosure. Such anodization may be performed before, during, and/or after the operation 901 where the deep-draw shell is formed.

By way of yet another example, blocks 901 and 902 describe forming the deep-draw shell and cutting the apertures in the as separate, linearly performed operations. However, in various implementations forming of the deep-draw shell and cutting the apertures may both be performed as part of a single, unitary operation.

By way of still another example, in various implementations the method 900 may include the operation of polishing one or more portions of the deep-draw shell. For example, such an operation may polish one or more back or side walls.

By way of an additional example, the method 900 may include the operation of coupling a base to an underside of the deep-draw shell without departing from the scope of the present disclosure. The base may be coupled to the deep-draw shell, the key layer, and/or the platform. Such coupling may be performed utilizing adhesive.

In still another example, various implementations may include the additional operation of forming the cavity on the underside of the platform without departing from the scope of the present disclosure. Such a cavity may be formed when molding and/or otherwise forming the platform, formed after forming of the platform by cutting or otherwise removing material of the platform to form the cavity, and so on. Though the present disclosure illustrates and describes the cavity as a single cavity, it is understood that in various implementations the platform may include multiple cavities. For example, a battery and circuit board may be coupled to top inside surfaces of two separate cavities without departing from the scope of the present disclosure.

As discusses above and illustrated in the accompanying figures, the present disclosure describes systems, methods, and apparatuses involving input device features. An input device may include a deep-draw shell with an aperture on a top surface in which a selector is positioned, a platform positioned under the selector that has a cavity in an underside of the platform, and a circuit board positioned on the upper surface of the cavity. The platform may stiffen the input device and/or block the circuit board from liquid entering the apertures. In some implementations, the input device may be a keyboard such as a wireless keyboard and the selector may be a number of keys.

In various implementations, the circuit board may have a substrate including a tab portion with one or more conductors such as one or more traces disposed thereon. The tab portion may form a male connector such as a male power connector for the circuit board and/or the input device that connects to a power cable. In some implementations, the deep-draw shell may include an antenna aperture with first and second surfaces and the circuit board may include an antenna and/or antenna controller electrically coupled to the first and second surfaces. The antenna may utilize the aperture for wireless broadcasting and/or receiving and the dimensions of the antenna aperture may be tuned to the antenna.

In the present disclosure, the methods disclosed may be performed utilizing sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A keyboard device, comprising:
a group of keys;
a sheet metal shell defining a web having an array of openings along a top surface and side surfaces surrounding the top surface, each key positioned in a respective opening of the array of openings and separated by a section of the web;
a platform enclosed within the sheet metal shell under the group of keys and supporting the group of keys, the platform defining a cavity having a lower surface opposite the group of keys that is recessed into the platform; and
a circuit board coupled to the lower surface of the platform such that the circuit board is positioned within the cavity and below at least a portion of the group of keys, the circuit board operable to control the keyboard device; wherein:
the platform is positioned between the web and the circuit board and forms a liquid barrier for liquid that enters through an opening of the array of openings.

2. The keyboard device of claim 1, wherein
the circuit board is suspended from the lower surface; and
the suspension of the circuit board prevents liquid in the cavity under the circuit board from reaching the circuit board.

3. The keyboard device of claim 1, wherein:
the keyboard device further comprises a base attached to the sheet metal shell and defining a bottom surface of the keyboard device; and
the platform is coupled to the base by an adhesive.

4. The keyboard device of claim 1, wherein the platform is substantially wedge-shaped.

5. The keyboard device of claim 1, wherein the top surface and side surfaces define a seamless continuous external surface of the keyboard device.

6. The keyboard device of claim 1, wherein:
the keyboard device further comprises a base attached to the sheet metal shell and defining a bottom surface of the keyboard device;
the platform is attached to the sheet metal shell and the base; and
the platform rigidly couples the group of keys to the base.

7. The keyboard device of claim 1, further comprising:
a switch circuit board comprising a set of switches; wherein
the switch circuit board is between the group of keys and the platform, and
at least one of the set of switches corresponds to at least one key of the group of keys and is actuated when the at least one key is pressed.

8. The keyboard device of claim 1, wherein:
the sheet metal shell is formed from a single aluminum sheet; and
the single aluminum sheet defines multiple walls extending from the top surface that define the side surfaces, and
the sheet metal shell is without seams along adjacent walls.

9. The keyboard device of claim 1, wherein:
the sheet metal shell includes a rear aperture formed in a rear wall of the sheet metal shell;
the sheet metal shell is electrically coupled to the circuit board; and
a portion of the sheet metal shell defining the rear aperture transmits or receives radio-frequency signals.

10. The keyboard device of claim 9, wherein a width of the portion of the sheet metal shell defining the rear aperture is configured to transmit and receive radio-frequency signals at a transmission wavelength.

11. The keyboard device of claim 9, wherein
the sheet metal shell is formed from an aluminum sheet having an anodized coating; and
the sheet metal shell is electrically connected to the circuit board via a region on a surface of the sheet metal shell that is substantially free of the anodized coating.

12. The keyboard device of claim 1, wherein the keyboard device is configured to operate as a wireless radio-frequency keyboard.

13. A wireless keyboard, comprising:
a shell formed from sheet metal and defining a web having openings formed along a top surface, sidewalls extending downward from the web, and a rear sidewall defining an aperture;
a set of keys at least partially enclosed in the shell, each key of the set of keys extending through a corresponding opening of the openings of the web;
a platform positioned below and supporting the set of keys, the platform defining a cavity positioned below at least a portion of the set of keys; and a circuit board positioned within the cavity of the platform and operable to control the wireless keyboard, wherein the rear sidewall of the shell defining the aperture is electrically connected to the circuit board, and the rear sidewall of the shell defining the aperture transmits or receives radio-frequency communication between an external device and the circuit board.

14. The wireless keyboard of claim 13, wherein a width of the rear sidewall of the shell defining the aperture is configured to facilitate transmission and reception of radio-frequency signals at a transmission frequency.

15. A method for making a keyboard device, the method comprising:

forming a sheet metal shell comprising a top portion and multiple walls;

forming a set of openings in the top portion of the sheet metal shell to define a web;

installing a group of keys in the sheet metal shell, each key of the group of keys extending through a respective opening of the set of openings;

installing a platform in the sheet metal shell under the group of keys that is fully enclosed by the sheet metal shell and supports the group of keys, the platform having a cavity that is positioned below at least a portion of the group of keys and is recessed into the platform in a lower surface opposite the group of keys;

installing a circuit board within the cavity and coupling the circuit board to the platform, the platform positioned between the web and the circuit board to form a liquid barrier; and electrically coupling the circuit board to the group of keys.

16. The method of claim 15, wherein:

the top portion and the multiple walls of the sheet metal shell are formed without seams.

17. The wireless keyboard of claim 13, wherein the shell is formed by bending a sheet of aluminum; and the sidewalls of the shell are joined without welds or seams.

18. A keyboard, comprising:

a sheet metal shell defining a web having an array of openings and a set of sidewalls that extend downward from the web;

a set of keys positioned at least partially within the sheet metal shell, each key extending through a respective opening of the array of openings;

a base coupled to the set of sidewalls of the sheet metal shell and defining a bottom surface of the keyboard;

a plastic platform extending upward from the base and supporting the set of keys, the plastic platform defining a cavity positioned below at least a portion of the set of keys; and a circuit board positioned within the cavity and operably coupled to the set of keys;

wherein the plastic platform shields the circuit board from water that enters through the openings of the web.

19. The keyboard of claim 18, wherein:

the sheet metal shell defines an interior enclosure; and the plastic platform substantially fills the interior enclosure.

20. The keyboard of claim 18, wherein the plastic platform is bonded to the base by an adhesive.

* * * * *